(12) United States Patent
Kassner et al.

(10) Patent No.: US 10,940,757 B2
(45) Date of Patent: Mar. 9, 2021

(54) USER INTERFACES, COMPUTER PROGRAM PRODUCT, SIGNAL SEQUENCE, TRANSPORTATION VEHICLE AND METHOD FOR DISPLAYING INFORMATION ON A DISPLAY DEVICE

(71) Applicant: VOLKSWAGEN AKTIENGESELLSCHAFT, Wolfsburg (DE)

(72) Inventors: Astrid Kassner, Berlin (DE); Jaqueline Cullmann, Braunschweig (DE); Nils Kötter, Hannover (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/471,843

(22) PCT Filed: Dec. 20, 2017

(86) PCT No.: PCT/EP2017/083800
§ 371 (c)(1),
(2) Date: Jun. 20, 2019

(87) PCT Pub. No.: WO2018/122062
PCT Pub. Date: Jul. 5, 2018

(65) Prior Publication Data
US 2019/0322175 A1 Oct. 24, 2019

(30) Foreign Application Priority Data

Dec. 27, 2016 (EP) .................................... 16206960

(51) Int. Cl.
*B60K 28/06* (2006.01)
*B60K 35/00* (2006.01)
*G06F 3/14* (2006.01)

(52) U.S. Cl.
CPC ............ *B60K 28/066* (2013.01); *B60K 35/00* (2013.01); *G06F 3/14* (2013.01);
(Continued)

(58) Field of Classification Search
CPC ........ G06F 3/1423; G06F 3/013; G06F 3/012; G06F 3/14; G06F 3/0484; B60K 35/00;
(Continued)

(56) References Cited

U.S. PATENT DOCUMENTS

2012/0215403 A1* 8/2012 Tengler ................. B60K 37/06
701/36
2013/0097557 A1* 4/2013 Madau ............... G06K 9/00845
715/810

(Continued)

FOREIGN PATENT DOCUMENTS

DE        102008038816 A1    2/2010
DE    10 2011 084 887      *    4/2013        B60K 28/066
(Continued)

OTHER PUBLICATIONS

Search Report for International Patent Application No. PCT/EP2017/083800; dated May 14, 2018.

*Primary Examiner* — Nabil H Syed
(74) *Attorney, Agent, or Firm* — Barnes & Thornburg LLP

(57) ABSTRACT

User interfaces, a computer program product, a signal sequence, a transportation vehicle, and a method for displaying information on a display device of a transportation vehicle. The method includes determining an information to be displayed, determining that a user sees the display device and, in response thereto, displaying a message representing the information on the display device. In response to the display of the message on the display device, to determine
(Continued)

that the user looks away from the display device and, in response thereto, to hide the message.

10 Claims, 2 Drawing Sheets

(52) U.S. Cl.
CPC ............... *B60K 2370/1529* (2019.05); *B60K 2370/166* (2019.05); *B60K 2370/193* (2019.05); *B60K 2370/195* (2019.05); *B60K 2370/197* (2019.05); *B60K 2370/52* (2019.05); *B60K 2370/736* (2019.05); *B60K 2370/741* (2019.05)

(58) Field of Classification Search
CPC ............... B60K 28/006; B60K 28/066; B60K 2370/186
USPC ..... 340/435, 436, 438, 439; 345/7; 701/301, 701/36
See application file for complete search history.

(56) References Cited

U.S. PATENT DOCUMENTS

| | | | |
|---|---|---|---|
| 2014/0191940 A1* | 7/2014 | Edgren | G06F 3/04815 345/156 |
| 2014/0250395 A1* | 9/2014 | Tanaka | G06F 3/04817 715/765 |
| 2015/0015479 A1* | 1/2015 | Cho | B60K 35/00 345/156 |
| 2015/0055808 A1* | 2/2015 | Vennstrom | G06F 3/013 381/307 |

FOREIGN PATENT DOCUMENTS

| | | |
|---|---|---|
| DE | 102011084887 A1 | 4/2013 |
| GB | 2535544 A | 8/2016 |

* cited by examiner ic cluster, a central information display, a head-up display, or similar. A message can be any kind of information to be output optically. It is then determined that the user looks away from the display device, which can be determined as described above. In response to this, a timer is started, which determines a time period for which the user is not looking at the display device. It is then determined that the user is looking at the display device again. In response to this, the message, which may have changed in the meantime, is displayed for a predefined period of time after the user has looked at the display device again. In other words, based on the period of time in which the user is not looking at the display device, the message is displayed for a period of time which allows the user to properly see the message. This can also depend on the importance or relevance of the message.

USER INTERFACES, COMPUTER PROGRAM PRODUCT, SIGNAL SEQUENCE, TRANSPORTATION VEHICLE AND METHOD FOR DISPLAYING INFORMATION ON A DISPLAY DEVICE

PRIORITY CLAIM

This patent application is a U.S. National Phase of International Patent Application No. PCT/EP2017/083800, filed 20 Dec. 2017, which claims priority to European Patent Application No. 16206960.3, filed 27 Dec. 2016, the disclosures of which are incorporated herein by reference in their entireties.

SUMMARY

Illustrative embodiments relate to user interfaces, a computer program product, a signal sequence, a transportation vehicle, and a method for displaying information on a display device. In particular, the illustrative embodiments relate to a demand-oriented use of a display device as well as to a demand-oriented design of a display duration.

BRIEF DESCRIPTION OF THE DRAWINGS

Exemplary embodiments are described in greater detail with reference to the attached drawings, in which.

DETAILED DESCRIPTION

Figure 1:
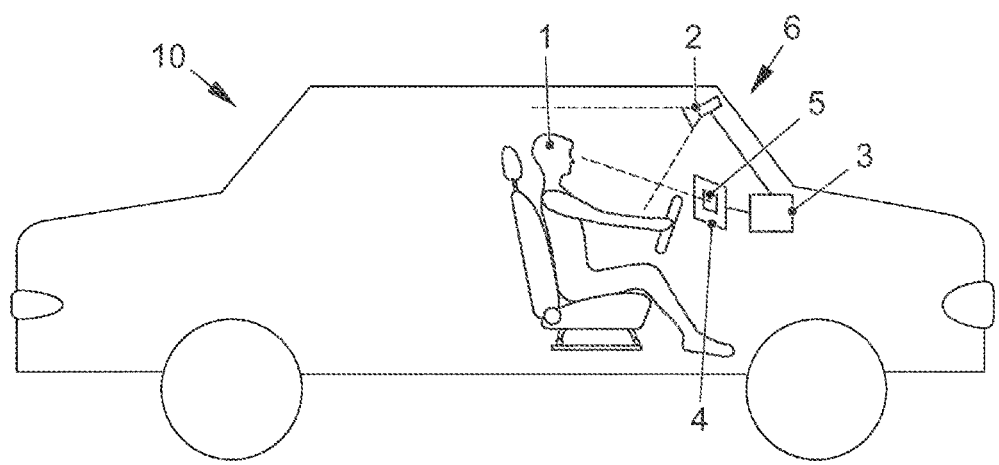
FIG. 1 shows a transportation vehicle in accordance with an exemplary embodiment in which a disclosed embodiment of a respective user interface is installed.

Numerous, mostly dynamic indications in transportation vehicle displays require that the driver perceives their content or if applicable, even acts accordingly. For example, it is important that the driver sees a warning indicator in the instrument cluster that warns of a low level of fuel in the tank. Further displays with a need for perception and action, for example, are suggestions which an intelligent assistant presents to the driver. Here, suggestions tailored to the driver and the situation are presented. So that the driver can benefit from these and the respective operating approach is evaluated by the user as suitable, it is also important that the driver is able to perceive the suggestions and has enough time to decide on the options.

GB 2535544 A discloses a user interface in a transportation vehicle, in which an information item is displayed on a display when the user views the display. It is also proposed to display an information item from a first display on a second display when the user views the first display.

DE 10 2008 038 816 A1 discloses a user interface for a transportation vehicle, in which the movements of the driver's eyes are analyzed to examine the condition of the driver. Based on the condition of the driver, a specific item of information is not hidden on an optical display or covered by another display until it is inferred from the gaze direction and a gaze duration of the driver that the driver has also registered this specific information item. In addition, it is proposed to display a specific information item on an optical display based on the gaze direction, to ensure that the driver registers this information immediately.

DE 10 2011 084 887 A1 discloses the hiding of information on a display screen of a transportation vehicle, if it is detected that the user is viewing the information/the screen for too long, so that there is a danger that the driver is too distracted by the information from events happening on the road. The purpose of hiding the message is to allow the user to automatically look back at the road.

The mere display of the warnings or suggestions for a certain period, however, cannot ensure that the driver has consciously taken in the display or had enough time to decide on a particular option if required. Another problem is that when a message is displayed the driver feels forced to view it as soon as possible and is thus distracted, especially in stressful traffic situations. In addition, a display of messages which are addressed to the driver of the transportation vehicle can obstruct the other occupants from viewing a previously displayed screen content. For example, a display screen may be displaying a television program, a video, a photo or other type of multimedia content. Since the message may not be relevant to the rest of the occupants, such a disturbance is to be avoided as far as possible.

Disclosed embodiments alleviate or eliminate the above-mentioned drawbacks of the prior art.

The aforementioned is achieved according to a first disclosed embodiment by a method for displaying information on a display device (e.g., of a transportation vehicle). The display device can be designed as an instrument cluster, a central information display, a head-up display, or similar. In a first operation an information item to be displayed is determined. This operation can temporally precede the operations described below. In other words, the need is identified to communicate the information to the user using a visual representation. It is then determined that the user is looking at the display device. In other words, it is determined by sensors that the display device has moved into the user's field of view. It can be provided in this case that the display device is being consciously viewed by the user and focused upon. In other words, the user shows that the information on the display device is (should be) perceived by him/her. In response thereto a message representing the information is displayed on the display device. In other words, the display of the message is delayed until the user looks at the display device, which can be determined, for example, using eye tracking, head orientation or "gaze tracking". Although the information to be displayed has already been identified (much) earlier and its relevance for the user has been established, only in response to the identified possibility that the user can also perceive the message with a sufficient degree of probability is the message displayed on the display device. Thus, the possibility that other users/operators of the display might be disturbed by the display of the message is prevented. Moreover, the user is prevented from viewing (from the corner of his/her eye) the message in a situation in which his/her attention is required for other tasks. In this way, the user is not distracted from what is happening on the road or from other tasks by the message being displayed at an inopportune time. It is subsequently determined that the user is viewing the display device again and, in response to this, the message is displayed again. In other words, after the user averts their gaze, the message is revealed again as soon as the user views/focuses on the display device again.

The above-mentioned is achieved according to a second disclosed embodiment by a method for displaying information on a display device (such as a transportation vehicle). For this purpose, a message is displayed on the display device. The display device can be, for example, an instrument cluster, a central information display, a head-up display, or similar device. It is then determined that a user is looking away from the display device. In other words, during the display of the message the user has had the display device (at least for a short time) in a central, in particular, a primary, field of view and optionally also focused on it. In response to the user turning his/her gaze away from the display device, the message is hidden. This prevents the other users/operators of the display device (e.g., occupants of a transportation vehicle) being disturbed by the continued display of the message which may have little or no relevance to them. For the second disclosed embodiment also, a gaze direction detection/gaze tracking and/or a head orientation of the user can be detected. The proposed method ensures that messages are displayed at times when they are urgent. The driver can also view them in their peripheral vision due to the movement on the display without turning their gaze away from the road. At the same time, in contrast to present displays, which can be hidden again after a certain period of time regardless of whether the driver turns to look at them, it is not necessary to look at the message immediately. The display period of the message only begins to elapse when the driver looks at the message or the display. The message thus "waits" for the driver and with the aid of the gaze tracking is only hidden from view again a certain period of time after the beginning of the viewing. It is additionally determined that the user is viewing the display device again and, in response to this, the message is displayed again. In other words, after the message is hidden due to the user averting their gaze, the message is revealed again as soon as the user views/focuses on the display device again. The benefits are obtained in a similar way to that described for the first period of studying the message by the user. Overall, this approach offers the benefit of informing the driver of incoming messages in a timely manner but without forcing the driver to change their gaze direction immediately, but rather enabling the viewing and processing of the message in non-critical traffic situations.

If, in the context of the present disclosure, an action "in response to" another event is mentioned, this does not rule out the possibility that, for example, a predefined period of time interval follows the event, after the expiry of which the action is triggered according to the disclosure. Such time intervals can be used to calm the display.

To predefine a suitable display period for the message, in response to the viewing of the message a timer can be started by the user, on the expiry of which the message is hidden (no longer shown). The timer can be dimensioned in such a way that 90% or 95% of the users consider the total time for studying the message to be appropriate. By only starting the timer when the message is viewed by the user, it is possible to ensure that the user has not only perceived the message but has also had sufficient time to grasp and assess its full information content.

If the user is diverted from the continued viewing of the message/display device (e.g., due to other tasks), the timer can be stopped in response to the user's no longer viewing the display. In other words, the timer pauses, in particular, for the time in which the user is not viewing/focusing on the display device (in the meantime).

To guarantee the total display time according to the predefined running time of the timer, the timer can be continued in response to a renewed viewing of the display device by the user. This process can be continued as often as desired for each warning/each information item which it is necessary to display, until the total running time of the timer is ended. Of course, it is possible to provide for extending the total running time of the timer depending on the number of interruptions that occur in the viewing of the display device. For example, for each interruption half a second of additional total running time of the timer can be added to compensate for focusing operations by the eyes of the user, as well as for relocating a text passage at which the user has interrupted the reading of the message.

If the disclosed method is executed, for example, in a transportation vehicle, then a function of the transportation vehicle can use the message. In other words, the transportation vehicle can inform the user about its condition and/or a traffic situation. Alternatively or additionally, it can inform the user of an incoming message (e.g., text message, email, voice message, etc.). In addition, the status of resources and alternatively or additionally, a navigation function/on-board computer function can trigger the display of the message. In addition, the transportation vehicle could present suggestions to the user to perform certain actions (e.g., to remind them to make a phone call to a spouse, because this is always done at a certain time).

According to a third disclosed embodiment, a user interface for displaying messages on a display device (e.g., of a transportation vehicle) is proposed. The display device can be implemented as an instrument cluster, a central information display, a head-up display, or similar. The user interface comprises a data input, an evaluation unit and a data output. The data input can be, for example, a bus node and/or a sensor cable. The evaluation unit can be implemented as a programmable processor, microcontroller, electronic control unit, etc. The data output can also have a bus node and be designed for connecting to the display device. The above-mentioned hardware can also be used for a user interface according to a fourth disclosed embodiment (as described above). The evaluation unit is configured to determine, by the data input, an information item to be displayed and in addition, to determine that a user is viewing/focusing on the display device. In response to the information, by the data output, the evaluation unit can display a message representing the information on the display device. The user interface described above is configured in an appropriate way to realize the features, combinations of features and benefits of the method according to the first disclosed embodiment.

According to a fourth disclosed embodiment a user interface for displaying messages on a display device (e.g., of a transportation vehicle) is proposed. The hardware is the same as that of the user interface according to the third disclosed embodiment. The evaluation unit of the user interface according to the fourth disclosed embodiment is configured to display a message on the display device by the data output. By the data output the control unit is configured to detect when the user looks away from the display device. For example, an optical sensor data can be connected to the data input of the user interface for information transfer. In response to the user turning their gaze away from the display device, the evaluation unit can hide the message by the data output. Also, with regard to the features, feature combinations and the resulting benefits of the user interface according to the fourth disclosed embodiment, to avoid repetitions reference is made to the above comments on the other three disclosed embodiments.

According to a fifth disclosed embodiment, a computer program product is proposed, which comprises instructions, which, when they are executed on an evaluation unit of a disclosed user interface in accordance with the third and/or fourth disclosed embodiments, cause the evaluation unit to perform the operations of a method in accordance with the first and/or the second disclosed embodiment. The computer program product can be implemented as a CD, DVD, Blue-Ray disc, flash memory, hard disk, RAM, ROM, cache, etc.

According to a sixth disclosed embodiment, a signal sequence is proposed, which represents the instructions, which, when executed on an evaluation unit of a disclosed user interface in accordance with the third and/or fourth disclosed embodiments, cause the evaluation unit to carry out the operations of a method in accordance with the first and/or the second disclosed embodiments. In this way, the provision of the instructions for information purposes is also protected for the case where the necessary storage resources are outside the scope of the attached claims.

According to a seventh disclosed embodiment, a transportation vehicle (for example, a car, a van, lorry, motorcycle, water-borne and/or airborne vehicle) is proposed, which has a user interface in accordance with the third and/or the fourth disclosed embodiments. The components can be implemented as components that are permanently integrated into the on-board power supply and information network of the transportation vehicle.

In the following, individual features of the disclosed embodiments are described without any restrictive intention for the purpose of further illustration. According to the present disclosure, gaze tracking is used to determine a viewing direction of the user. An infrared camera installed for the purpose can be used to detect when the driver looks at the display with the message that appears, or which area of the display the user is currently looking at.

In principle, the disclosed embodiments can be used for messages which are displayed in the instrument cluster and/or in the central information display. A benefit of the proposed teaching according to the disclosure is that the duration of the display of the messages is dependent on the user's gaze being turned towards the display. For example, the display period is not started, or the image display itself is not even performed, until the display is being viewed. As a result, there is no reason for the driver to avert their gaze from the road immediately on the appearance of the message, and hence there is a lower risk of distraction, allowing traffic safety to be increased. At the same time the sometimes longer display duration up to the point when the image is viewed, and hence any resulting masking of other display content, is not disturbing, as is the case in the prior art.

In addition to the control of the display duration the gaze tracking can be used to specify the period within which the driver can select one of the options that may be displayed. For example, suggestions from a personal intelligent assistant may be optionally accepted by the driver or else rejected to prevent annoyance to the driver. The period of time within which the driver can act can also be started by the gaze tracking. The benefit of using the gaze tracking is that the driver always has the complete display period at their disposal to decide on an option. This means that no hasty decisions need to be taken. Optionally, the system can take a decision independently (e.g., after a predefined and/or predefinable period of time).

The period of time within which the driver can decide may be displayed by an extending progress bar. An additional possibility is to use the display of the progress bar to indicate the system-side action selection in case the driver does not make an active decision within the indicated time interval. If the suggestions are very likely to be accepted by the driver, the progress bar is shown next to the "Accept" option of the suggestion. If the suggestions are less likely to be accepted, the progress bar is shown next to the "Reject" option. In this way, the user is shown graphically which option will be selected automatically by the operating system on the completion of the visually assigned progress bar.

FIG. 1 shows a car 10 as an exemplary embodiment of a transportation vehicle, in which a disclosed user interface 6 is permanently installed. A user 1 views a display screen 4 as the display unit, which is installed in a dashboard of the car 10. An electronic control unit 3 which is connected to the display screen 4 for information transfer as an evaluation unit, is connected for information transfer at the other side to an infrared camera 2. The user 1 is within the detection range of the infrared camera 2, which represents part of a data input of the electronic control unit 3. On the display screen 4, a message 5 is displayed for the user 1, which does not need to be noted by the user 1 urgently, but only at the appropriate time. Only when the user 1 (as shown) directs their gaze at the screen 4 is the message 5 displayed, so as not to distract the user 1 from the driving task when he/she is in a demanding traffic situation.

Figure 2:
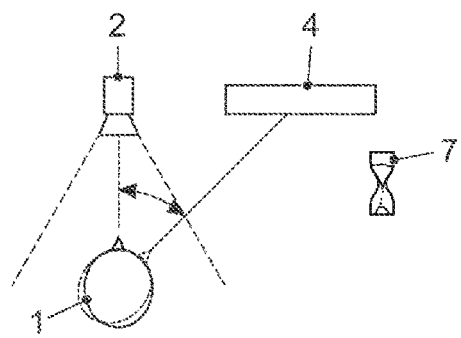
FIG. 2 shows a plan view of an disclosed operating situation.

FIG. 2 shows a plan view of a user 1, who is initially looking straight ahead in the direction of an infrared camera 2 as a data input and in this case not focusing on the screen 4, on which an already determined information item is to be displayed at a given time as a message 5. As soon as the user 1 turns their gaze to the right in the direction of the screen 4, a timer starts to run, which is illustrated by an hourglass icon 7. If the maximum run-time of the timer expires before the user 1 looks away from the screen 4 again, the message 5 is hidden in any case, and any part of the screen which it previously concealed is displayed fully again. If the user already looks away from the screen 4 before the expiry of the maximum timer run-time, the timer is stopped and continued as soon as the user 1 turns their gaze back to the screen 4.

Figure 3:
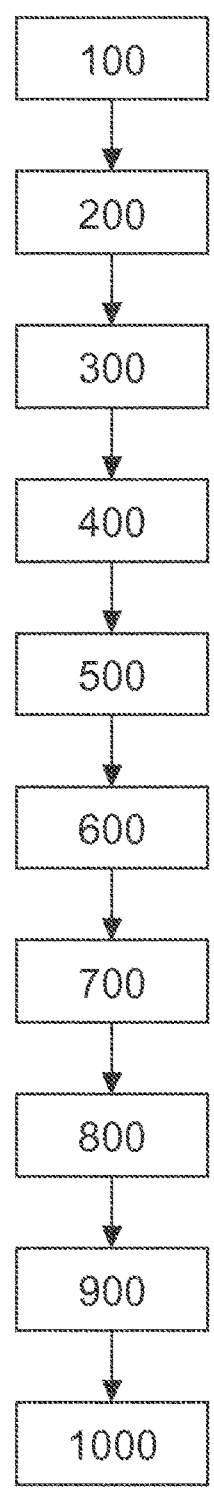
FIG. 3 shows a flow diagram illustrating an exemplary embodiment of a disclosed method.

FIG. 3 illustrates an exemplary embodiment of a disclosed method for displaying information on a display device of a transportation vehicle. In operation at 100, an information item to be displayed is determined by an on-board network of the transportation vehicle. In operation at 200 it is subsequently determined that a user is viewing and focusing on the display device. In response thereto, in operation at 300 a message representing the information is displayed on the display device. In this way, the user is not confronted with the message until he/she is looking at the display device anyway, and (obviously) has no more important areas of the environment to focus on. In operation at 400, in response to the viewing of the message by the user, a timer is started, on the expiry of which the message is hidden. In operation at 500 it is determined that the user has looked away from the display device. In response to this, two things happen: in operation at 600, the message is hidden to clear the display area for other information, which is being viewed, for example, by other occupants of the transportation vehicle. In operation at 700, the timer is stopped to limit a potential overall viewing time of the message by the user. In operation at 800 it is then determined that the user is viewing the display device again and in response to this, the message is displayed again in operation at 900. In operation at 1000 the timer is also restarted at the same time, after the expiry of which the user has had sufficient time to view the message, understand it and, if necessary, act on it accordingly.

Already at the time of determining the information which is required to be displayed in accordance with the disclosure by the message, an indicator can be output to the user that in response to the viewing of the display device, additional information is displayed as the disclosed message. The indicator can be in a particularly discreet form so as not to unduly distract the user. On the other hand this can prevent the user viewing the display device more frequently than necessary, in the hope that a message to be displayed in accordance with the disclosure will appear.

In the following individual features, feature combinations and properties of the present disclosure are presented, which complement the above description of the disclosed embodiments without restrictive effect.

For example, in accordance with the disclosed embodiments, a method for displaying information on a display device of a transportation vehicle may be provided and may include determining an information item to be displayed, determining that a user is viewing the display device and, in response thereto, displaying a message representing the information on the display device.

In accordance with the disclosed embodiments, the method may also further comprise determining that the user is no longer viewing the display device and, in response thereto, hide the message.

In accordance with the disclosed embodiments, the method may also further comprises starting a timer in response to the viewing of the message by the user, on the expiry of which the message is hidden.

In accordance with the disclosed embodiments, the method may also stop the timer in response to the fact that the user is no longer viewing the display device.

In accordance with the disclosed embodiments, the method may also continue the timer in response to a repeated viewing of the display device by the user.

In accordance with the disclosed embodiments, the method may also further comprise outputting an indicator to the user to the effect that the display device is ready to display a message that has not yet been displayed.

In accordance with the disclosed embodiments, the method may also output the indicator in a head-up display and/or in an instrument cluster and/or as an audible indicator and/or as a haptic indicator.

In accordance with the disclosed embodiments, wherein the user is a driver of the transportation vehicle.

In accordance with the disclosed embodiments, a user interface may be provided a user interface for displaying information on a display device of a transportation vehicle comprising a data input, an evaluation unit and a data output, wherein the evaluation unit is configured, using the data input to determine an information item and a viewing of the display device by the user, and in response thereto using the data output to display a message representing the information on the display device.

In accordance with the disclosed embodiments, a computer program product comprising instructions for performing the above-described method may also be provided.

In accordance with the disclosed embodiments, a signal sequence representing such instructions may also be provided.

In accordance with the disclosed embodiments, the provided user interface may be incorporated in the transportation vehicle.

LIST OF REFERENCE NUMERALS

1 user
2 infrared camera
3 electronic control unit
4 display screen
5 message
6 user interface
7 hourglass
10 car
100 to 1,000 method operations

The invention claimed is:

1. A method for displaying information items on a display device, the method comprising:
    determining an information item to be displayed;
    determining that a user is viewing the display device, and in response thereto, displaying a message representing the information item on the display device;
    in response to the user averting their gaze, hiding the message;
    determining that the user is viewing the display device again, and in response thereto, displaying the message again; and
    starting a timer to initiate a display period of the message in response to the user viewing the message;
    in response to whichever occurs first, expiry of the display period or the user averting their gaze, hiding the message;
    stopping the timer in response to the user no longer viewing the display device; and
    continuing the timer in response to the user again viewing the display device.

2. The method of claim 1 wherein the message relates to:
    a function of a transportation vehicle; and/or
    an incoming message; and/or
    a resource status; and/or
    a navigation function.

3. The method of claim 1 wherein the display device comprises:
    a head-up display; and/or
    a central information display; and/or
    an instrument cluster.

4. The method of claim 1 wherein the display device is in a transportation vehicle.

5. A user interface for displaying messages on a display device the user interface comprising:
    a data input;
    an evaluation unit; and
    a data output,
    wherein the evaluation unit is configured, using the data output, for executing the method comprising:
    determining an information item to be displayed;
    determining that a user is viewing the display device, and in response thereto, displaying the message representing the information item on the display device, using the data output;
    determining that the user looks away from the display device, and in response thereto using the data output to hide the message;
    determining that the user is viewing the display device again and, in response thereto, displaying the message again;
    starting a timer to initiate a display period of the message in response to the user viewing the message;
    in response to whichever occurs first, expiry of the display period or the user averting their gaze, hiding the message;
    stopping the timer in response to the user no longer viewing the display device; and
    continuing the timer in response to the user again viewing the display device.

6. A computer program product embodied in a non-transitory computer-readable storage medium comprising instructions which, when executed on an evaluation unit of a user interface for displaying messages on a display device, performs the method comprising:

determining an information item to be displayed;

determining that the user is viewing the display device and in response thereto, displaying a message representing the information item on the display device;

determining that the user is viewing the display device again and, in response thereto, displaying the message again;

starting a timer to initiate a display period of the message in response to the user viewing the message;

in response to whichever occurs first, expiry of the display period or the user averting their gaze, hiding the message;

stopping the timer in response to the user no longer viewing the display device; and continuing the timer in response to the user again viewing the display device.

7. A transportation vehicle comprising a user interface for displaying messages on a display device, the user interface comprising:
 a data input;
 an evaluation unit; and
 a data output,
 wherein the evaluation unit is configured, using the data input, for executing the method comprising:
  determining an information item to be displayed, and
  determining that a user is viewing the display device, and in response thereto using the data output to display a message representing the information item on the display device;
  determining that the user looks away from the display device, and in response thereto using the data output to hide the message;
  determining that the user is viewing the display device again and, in response thereto, displaying the message again;
  starting a timer to initiate a display period of the message in response to the user viewing the message;
  in response to whichever occurs first, expiry of the display period or the user averting their gaze, hiding the message;
  stopping the timer in response to the user no longer viewing the display device; and
  continuing the timer in response to the user again viewing the display device.

8. The user interface of claim 5 wherein the display device is in a transportation vehicle and comprised:
 a head-up display; and/or
 a central information display; and/or
 an instrument cluster.

9. The computer program product comprising the non-transitory computer readable storage medium of claim 6 wherein the display device is in a transportation vehicle.

10. The transportation vehicle of claim 7 wherein the display device comprises:
 a head-up display; and/or
 a central information display; and/or
 an instrument cluster.

* * * * *